Patented June 22, 1926.

1,589,936

UNITED STATES PATENT OFFICE.

OLIVER W. BROWN, OF BLOOMINGTON, INDIANA, AND CLYDE O. HENKE, OF SOUTH MILWAUKEE, WISCONSIN, ASSIGNORS TO THE NEWPORT COMPANY, OF CARROLL-VILLE, WISCONSIN, A CORPORATION OF DELAWARE.

PROCESS FOR THE REDUCTION OF AZO COMPOUNDS TO HYDRAZO COMPOUNDS.

No Drawing. Application filed November 2, 1925. Serial No. 66,391.

This invention relates to an improved process for reducing aromatic azo compounds to their respective hydrazo compounds.

We have found that the reduction of azo compounds may be conveniently effected by hydrogenation under pressure at an elevated temperature, and in the presence of a catalyst. We have found further that a catalyst containing nickel, or a straight nickel catalyst, is best adapted for the purpose, and that the reaction proceeds more regularly when the azo compound is partly or wholly dissolved in a suitable organic solvent, such as alcohol. The azo compounds may contain small quantities of azoxy compounds without affecting the resulting product.

The following example illustrates one application of our invention in a preferred form:

*Example.*—To a solution of azobenzene in alcohol is added some metallic nickel, prepared in a suitable manner, (as in a reduced state) and this mixture is then heated to 100° C. and shaken vigorously in the presence of hydrogen gas under a pressure of 250 lbs. per sq. inch. Hydrazobenzene is obtained in good yield and may be easily converted into benzidine by treatment with dilute acid.

If too high a temperature or too high a pressure be used, the corresponding amine is produced instead of the hydrazo compound. Thus in the above example, if carried out at 126° C. with 500 lbs. pressure of hydrogen gas, an almost quantitative yield of aniline is secured.

If too low a temperature is used the reaction is very slow or incomplete. Thus in the above example if carried out at 80° C. with 500 lbs. pressure only very little hydrazobenzene is secured.

Instead of starting with azo compound an azoxy compound or a mixture of an azo and an azoxy compound may be used. For instance, if azobenzene containing some azoxy-benzene is used, and the reaction carried out according to the example given, hydrazobenzene is the resultant product.

The product under other conditions than those given in the above example may be a mixture of hydrazo compound and amino compound or it may contain some unreduced azo compound, depending upon the conditions such as temperature, pressure of hydrogen gas and time under which the reaction is carried out.

Our invention is not restricted to the reduction of azoxy benzene and azobenzene, but is applicable to any aromatic azoxy or azo compound. Likewise any suitable solvent may be used. Also the temperatures and pressures are not limited to those mentioned. In place of hydrogen in a pure state water gas or any gaseous mixture containing hydrogen may be used.

We are aware that many changes may be made through a wide range without departing from the principles of this invention, and we, therefore, do not purpose limiting the patent granted hereon, otherwise than necessitated by the prior art.

We claim as our invention:

1. The process of reducing aromatic azoxy and azo compounds to their respective hydrazo compounds by the action of hydrogen gas under pressure upon the azoxy and azo compounds in an organic solvent, in the presence of a catalyst containing nickel.

2. The process of reducing aromatic azoxy and azo compounds to their respective hydrazo compounds by the action of a gas containing hydrogen under pressure upon the azoxy and azo compounds, in an organic solvent, in the presence of a nickel catalyst.

3. The process of reducing a mixture of azoxy-benzene and azobenzene to hydrazobenzene by the action of a gas containing hydrogen under pressure upon the mixture of azoxybenzene and azobenzene, in an organic solvent, in the presence of a catalyst containing nickel.

4. The process of reducing a mixture of azoxybenzene and azobenzene to hydrazobenzene by the action of a gas containing hydrogen under pressure upon the mixture of azoxybenzene and azobenzene, in an organic solvent, in the presence of a nickel catalyst.

5. The process of reducing a mixture of azoxybenzene and azobenzene to hydrazobenzene by the action of hydrogen gas under pressure upon the mixture of azoxybenzene and azobenzene, in an organic solvent, in the presence of a nickel catalyst.

6. The process of reducing azobenzene to hydrazobenzene by the action of a gas, containing hydrogen under pressure, upon the azobenzene, in a neutral solvent, in the presence of a catalyst containing nickel.

7. The process of reducing azobenzene to hydrazobenzene by the action of hydrogen gas under pressure upon the azobenzene, in a neutral solvent, in the presence of a nickel catalyst.

8. The process of reducing aromatic azoxy and azo compounds to their respective hydrazo compounds by the action of a gas containing hydrogen under pressure upon the azoxy and azo compounds in the presence of a neutral organic solvent and a catalyst containing nickel.

9. The process of reducing aromatic azoxy and azo compounds to their respective hydrazo compounds by the action of a gas containing hydrogen under pressure upon the azoxy and azo compounds in the presence of a neutral organic solvent and a catalyst containing nickel, at a temperature of approximately 100° C.

10. The process of reducing aromatic azoxy and azo compounds to their respective hydrazo compounds by the action of a gas containing hydrogen under 250 pounds pressure upon the azoxy and azo compounds in the presence of a neutral organic solvent and a catalyst containing nickel, at a temperature of approximately 100° C.

In testimony whereof we have hereunto subscribed our names.

OLIVER W. BROWN.
CLYDE O. HENKE.